United States Patent
Skinner et al.

(10) Patent No.: US 12,523,326 B2
(45) Date of Patent: Jan. 13, 2026

(54) LATERAL CONNECTOR FOR UNDERGROUND PIPES

(71) Applicant: Press-Seal Corporation, Fort Wayne, IN (US)

(72) Inventors: Daniel Krug Skinner, Fort Wayne, IN (US); Jimmy Gamble, Kendallville, IN (US); Daniel Gunckel, Fort Wayne, IN (US)

(73) Assignee: Press-Seal Corporation, Fort Wayne, IN (US)

( * ) Notice: Subject to any disclaimer, the term of this patent is extended or adjusted under 35 U.S.C. 154(b) by 0 days.

(21) Appl. No.: 18/244,619

(22) Filed: Sep. 11, 2023

(65) Prior Publication Data

US 2024/0084945 A1     Mar. 14, 2024

Related U.S. Application Data (60) Provisional application No. 63/406,298, filed on Sep. 14, 2022.

(51) Int. Cl.
    *F16L 41/08*     (2006.01)
    *F16L 25/00*     (2006.01)

(52) U.S. Cl.
    CPC ........... *F16L 41/08* (2013.01); *F16L 25/0036* (2013.01)

(58) Field of Classification Search
    CPC ... F16L 41/08; F16L 25/0045; F16L 25/0036; F16L 37/008; F16L 47/28
    See application file for complete search history.

(56) References Cited

U.S. PATENT DOCUMENTS

| | | | |
|---|---|---|---|
| 3,406,988 A | 10/1968 | Jones | |
| 3,899,198 A * | 8/1975 | Maroschak | F16L 37/084 285/133.11 |

(Continued)

FOREIGN PATENT DOCUMENTS

| | | | |
|---|---|---|---|
| AU | 2009202137 A1 * | 12/2009 | ............ F16L 41/088 |
| EP | 1591712 A2 | 11/2005 | |

(Continued)

OTHER PUBLICATIONS

European Search Report for EP Patent Application No. 23197228.2, Issued on Dec. 13, 2023, 11 pages.

(Continued)

*Primary Examiner* — Zachary T Dragicevich
*Assistant Examiner* — James A Linford
(74) *Attorney, Agent, or Firm* — Faegre Drinker Biddle & Reath LLP (57) ABSTRACT

A pipe junction includes a corrugated pipe including a pipe wall having an inner pipe wall and an outer pipe wall, the outer pipe wall having a plurality of peaks and a plurality of valleys disposed between the plurality of peaks, and an opening through the pipe wall. The corrugated pipe junction includes a hub and sleeve assembly received within the opening of the pipe wall, the hub and sleeve assembly including a hub received within the sleeve. When the hub and sleeve assembly is received within the opening of the pipe wall, a compressive seal is formed between the hub and sleeve assembly and the inner pipe wall such that the hub and sleeve assembly is sealingly engaged with the inner pipe wall around an entire circumference of the hub and sleeve assembly.

5 Claims, 11 Drawing Sheets

(56) References Cited

U.S. PATENT DOCUMENTS

| | | | |
|---|---|---|---|
| 4,059,291 A * | 11/1977 | Acda | F16L 37/008 |
| | | | 285/423 |
| 4,286,808 A | 9/1981 | Fouss et al. | |
| 4,441,744 A | 4/1984 | Oostenbrink et al. | |
| 5,072,972 A * | 12/1991 | Justice | F16L 25/0036 |
| | | | 285/903 |
| 6,044,591 A | 4/2000 | Hegler | |
| 6,113,156 A | 9/2000 | Bea | |
| 6,508,490 B1 | 1/2003 | Hoffman | |
| 7,988,203 B2 | 8/2011 | Martin | |
| 8,196,968 B2 | 6/2012 | Kief et al. | |
| 9,528,643 B2 | 12/2016 | Anderson et al. | |
| 10,094,503 B2 | 10/2018 | Kelk | |
| 2006/0181078 A1 | 8/2006 | Lauridsen | |
| 2019/0024831 A1 * | 1/2019 | Whiteman | F16L 41/08 |
| 2021/0372552 A1 | 12/2021 | Keene et al. | |

FOREIGN PATENT DOCUMENTS

| | | | |
|---|---|---|---|
| EP | 2100070 B2 | 9/2019 | |
| GB | 1227975 A | 4/1971 | |
| GB | 1442624 A | 7/1976 | |
| WO | 2002/103234 A2 | 12/2002 | |
| WO | 2008/069644 A2 | 6/2008 | |

OTHER PUBLICATIONS

Office Action received for European Application No. 23197228.2, mailed on Apr. 15, 2025, 5 pages.

* cited by examiner

LATERAL CONNECTOR FOR UNDERGROUND PIPES

CROSS REFERENCE TO RELATED APPLICATION

This application claims the benefit of U.S. Provisional Application Ser. No. 63/406,298, filed Sep. 14, 2022, and entitled LATERAL CONNECTOR FOR UNDERGROUND PIPES, the entire disclosure of which is hereby expressly incorporated herein by reference.

BACKGROUND OF THE DISCLOSURE

1. Technical Field

The present disclosure relates to lateral connectors that are inserted into openings of underground pipes of the type used in underground water systems to provide a sealing connection between the pipe and a connector, to which another pipe may be connected to form a lateral pipe joint.

2. Description of the Related Art

Underground water systems, such as sewers and storm water systems, include corrugated pipes made of a rigid plastic material. In some instances, it is desired to connect corrugated pipes with one another and/or to connect a branch or connecting pipe to a corrugated pipe to form a lateral connection. It is known in the art to use lateral connectors or connector sleeves to join a branch or connecting pipe to a corrugated pipe, though in many cases, connectors used for these applications are cumbersome to install, provide insufficient sealing and/or must be stocked in a large number of sizes for use with varying sized corrugated pipes.

What is needed is a lateral connector for corrugated pipes which is an improvement over the foregoing.

SUMMARY OF THE DISCLOSURE

The present disclosure is directed generally to corrugated pipes for use in underground water systems and, in particular, to a lateral connector assembly for coupling the corrugated pipe with a connecting or branch pipe while retaining a sealing connection between the lateral connector assembly and the connecting pipe.

The present disclosure provides a corrugated pipe junction including a corrugated pipe including a pip wall having an inner pipe wall and an outer pipe wall, the outer pipe wall having a plurality of peaks and a plurality of valleys disposed between the plurality of peaks, and an opening through the pipe wall. The corrugated pipe junction includes a hub and sleeve assembly received within the opening of the pipe wall, the hub and sleeve assembly including a hub received within the sleeve such that at least a portion of the outer surface of the hub is in contact with an inner surface of the sleeve. When the hub and sleeve assembly is received within the opening of the pipe wall, a compressive seal is formed between the hub and sleeve assembly and the inner pipe wall such that the hub and sleeve assembly is sealingly engaged with the inner pipe wall around an entire circumference of the hub and sleeve assembly.

The present disclosure provides a hub and sleeve assembly for forming a junction with a corrugated pipe, the corrugated pipe having a pipe wall defined by an inner pipe wall and an outer pipe wall, the outer pipe wall having a plurality of peaks and a plurality of valleys disposed between the plurality of peaks. The hub and sleeve assembly includes a sleeve defined by an outer body extending along a longitudinal axis between a proximal end and a distal end, the sleeve having at least one pipe stop feature extending from an outer surface of the cylindrical outer body, and the at least one pipe stop feature defined by an inner radial stop spaced from an outer radial stop by an opening configured for receiving a portion of the inner pipe wall. The hub and sleeve assembly further includes a hub received within the sleeve and defined by an outer body, and the cylindrical body of the sleeve being defined by a wall thickness having a nominal thickness at a proximal end and a thickness value at the distal end that is greater than the nominal thickness such that a portion of the cylindrical body defines a region of increased thickness.

The present disclosure provides a method of forming a junction between a hub and sleeve assembly and a corrugated pipe, the corrugated pipe having a pipe wall including an inner pipe wall and an outer pipe wall. The outer pipe wall includes a plurality of peaks and a plurality of valleys disposed between the plurality of peaks. The method includes inserting a sleeve of the hub and sleeve assembly through an opening of the pipe wall of the corrugated pipe to engage the inner pipe wall of the corrugated pipe with a portion of at least one pipe stop feature extending from the sleeve, the sleeve defined by a first end and a second end and an outer body extending therebetween, the outer body having a nominal thickness and a region of increased thickness that is defined by a value larger than a value of the nominal thickness. The method further includes inserting a hub of the hub and sleeve assembly within the sleeve until a bottom edge of the hub engages with at least one hub stop feature extending from a bottom surface of the sleeve such that a portion of the hub is compressed against the region of increased thickness and laterally aligned with the portion of the sleeve that is engaged with the inner pipe wall, such that a compressive seal is formed between the corrugated pipe and the hub and sleeve assembly around an entire circumference of the hub and sleeve assembly.

BRIEF DESCRIPTION OF THE DRAWINGS

The above mentioned and other features and objects of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate embodiments of the disclosure and such exemplifications are not to be construed as limiting the scope of the disclosure in any manner.

DETAILED DESCRIPTION

Figure 1A:
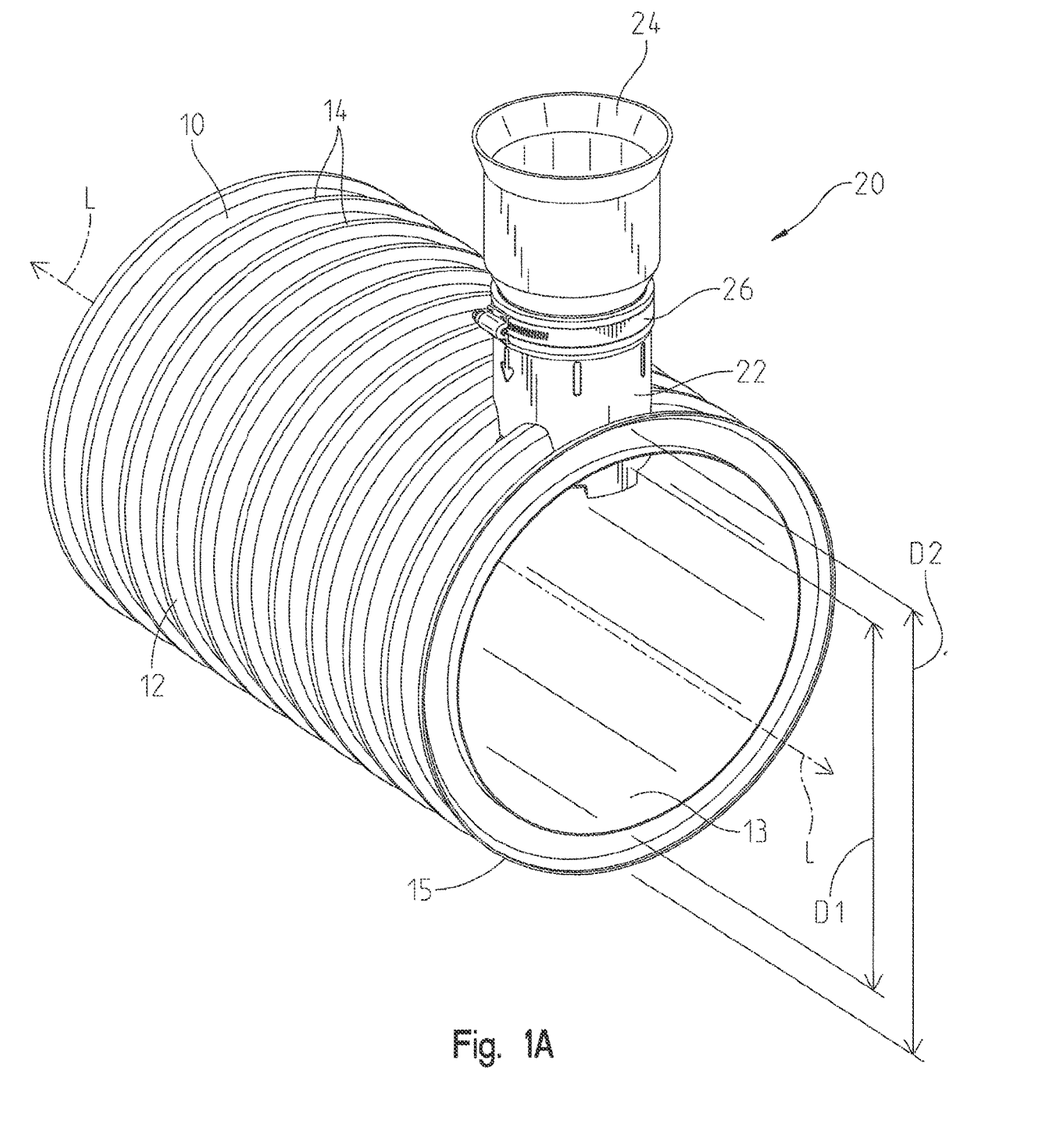
FIG. 1A is a perspective view of a corrugated pipe and a lateral connector assembly.
Figure 1B:
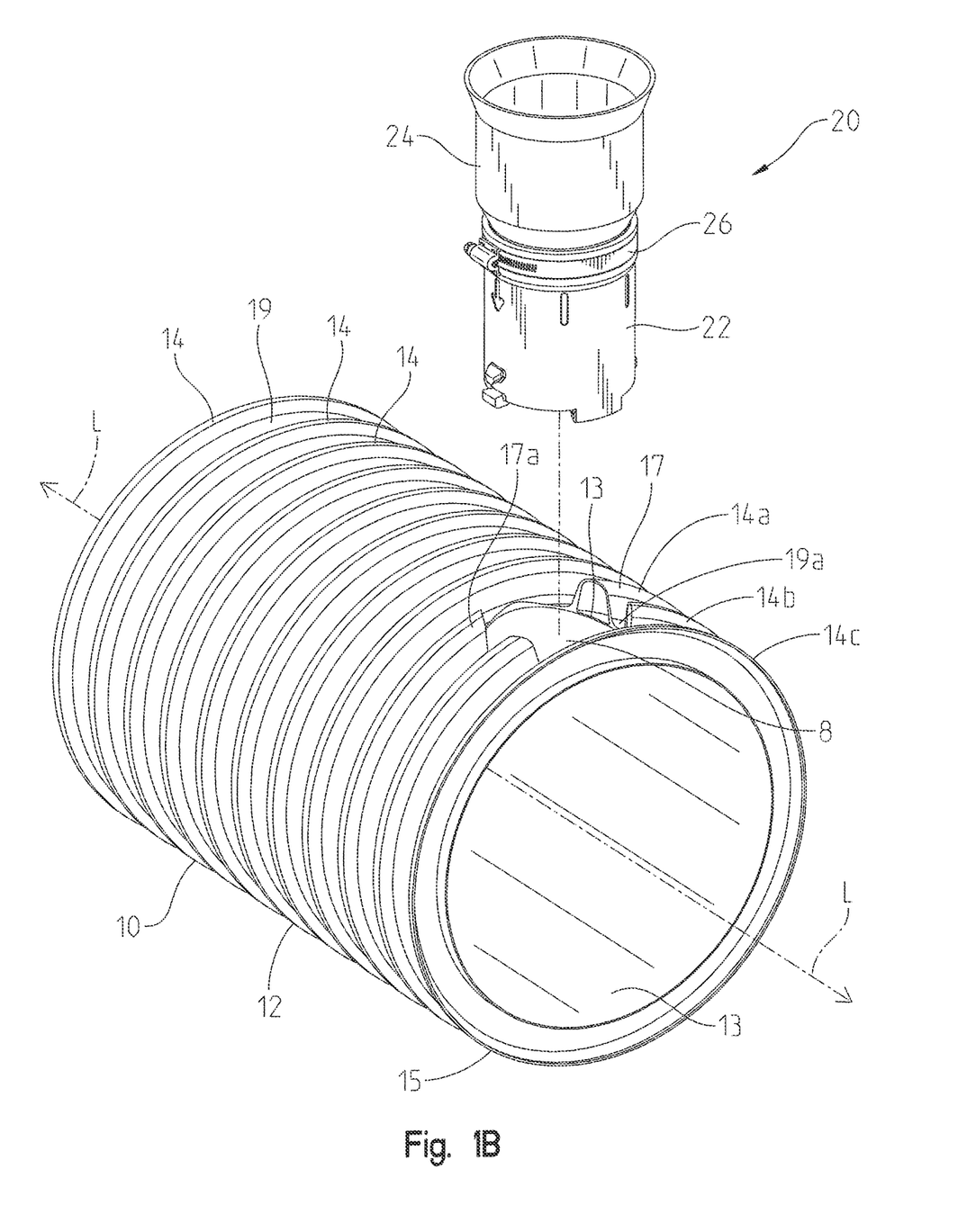
FIG. 1B is an exploded view of the corrugated pipe and the lateral connector assembly of FIG. 1A.
Figure 3:
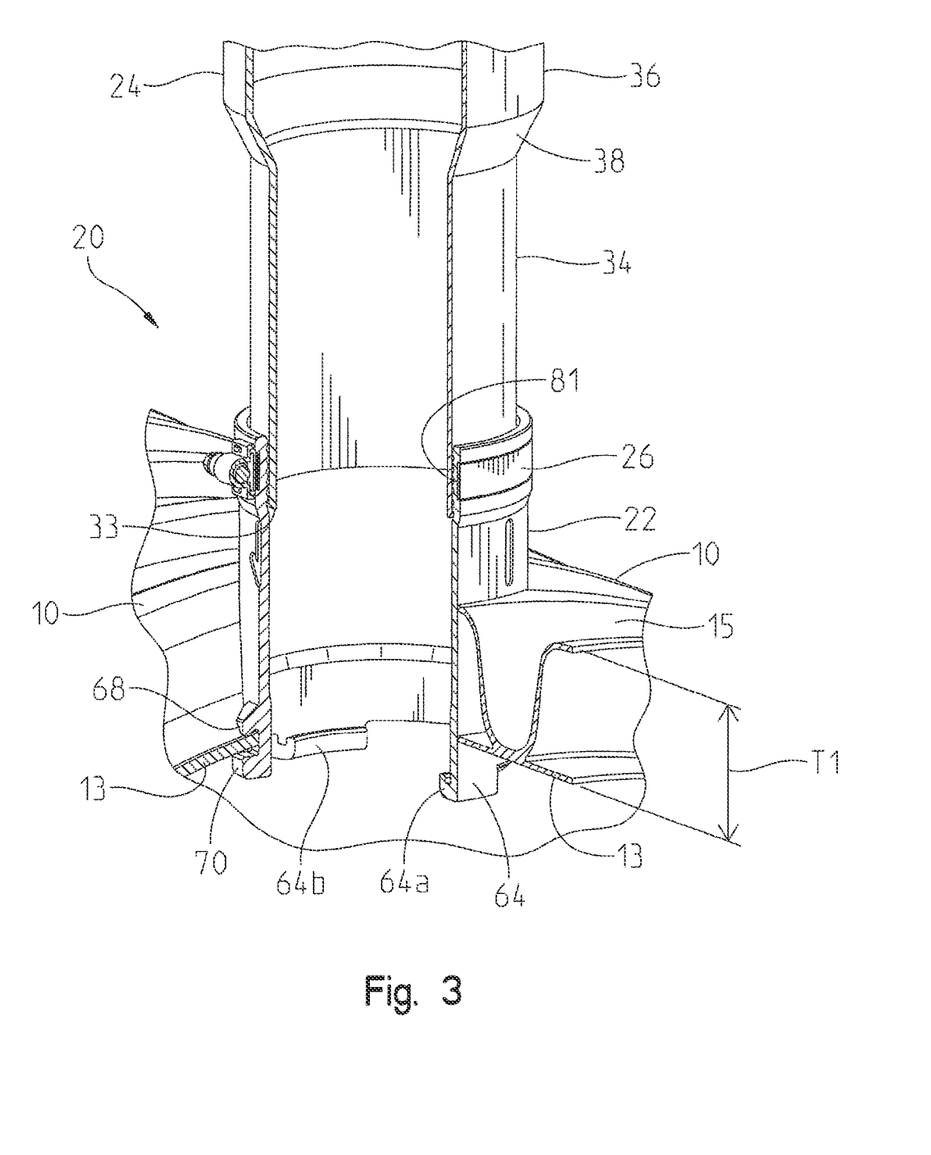
FIG. 3 is a cross sectional view of a step during assembly of the lateral connector assembly.

Referring to FIG. 1A, a perspective view of a corrugated pipe 10 is shown. The pipe 10 is defined by a pipe wall 12 extending along a longitudinal axis L of the pipe 10. The pipe wall 12 is defined by an inner pipe wall 13, an outer pipe wall 15, and with a thickness T1 (FIG. 3). As illustrated in FIG. 1A, the inner pipe wall 13 has a generally cylindrical configuration and is defined by a generally smooth surface. The corrugated pipe 10 includes an inner diameter D1 that is defined by the interior surface of the inner pipe wall 13 of the pipe wall 12. In some embodiments, the inner diameter D1 may have a value that is a little as 8, 12, or 24, or as great as 30, 48, 60, or any range including any two of these amounts as endpoints. For example, the inner diameter D1 may have a value of 8-30, 12-48, or 24-60. With reference to FIGS. 1A-1B, the outer pipe wall 15 is defined by a plurality of corrugations 14, or ridges, that extend circumferentially around the corrugated pipe 10 and are positioned longitudinally along the corrugated pipe 10. Each of the plurality of corrugations 14 is defined by a peak 17 positioned adjacent a valley 19, such that the valleys 19 extend between each two of a plurality of peaks 17. As illustrated, a thickness of the outer pipe wall 15 may be defined by a distance between each peak 17 and a base of each valley 19. In this way, the wall thickness T1 may vary depending on where the thickness T1 is measured along the pipe wall 12, longitudinally.

As illustrated best in FIG. 1B, the corrugated pipe 10 may have an opening 8 extending through at least one or more of the corrugations 14 of the pipe 10. For example, in the illustrative embodiment of FIG. 1B, the opening 8 occupies the first corrugation 14a, a second corrugation 14b and a third corrugation 14c of the pipe 10. Additionally, with reference still to FIG. 1B, the opening 8 extends through the pipe wall 12 (i.e., through both the outer pipe wall 15 and the inner pipe wall 13). As will be described further herein, the opening 8 may be configured for receiving a lateral connector assembly, illustratively a hub and sleeve assembly 20. Due to the configuration of the opening 8, the hub and sleeve assembly 20 extends within and through both the inner pipe wall 13 and the outer pipe wall 15 to facilitate engagement between the hub and sleeve assembly 20 and the inner pipe wall 13, as will be described further herein. The hub and sleeve assembly 20 may provide an opening for receiving an additional pipe (not shown), and as such, provide for a sealed lateral connection between the corrugated pipe 10 and a connecting or branch pipe.

Throughout the description herein, components of the corrugated pipe 10 and the hub and sleeve assembly 20 may be defined with reference to the longitudinal axis L defined by the corrugated pipe 10. For example, when components are characterized as having a radial position, such as an inner radial or outer radial position, this radial positioning may be in reference to the radial distance of the component relative to the longitudinal axis L.

With reference still to FIGS. 1A-1B, the hub and sleeve assembly 20 will be described further herein. The hub and sleeve assembly 20 includes a sleeve 22, a hub 24 received within the sleeve 22, and a clamp 26, for example a take-down clamp, positioned around the sleeve 22. The hub and sleeve assembly 20 will be described further herein with reference to FIGS. 1A-1B and the exploded view of FIG. 2. As illustrated best in FIG. 2, the hub 24 has an outer body 30 extending between a proximal end 32 and a distal end 33 opposite the proximal end 32. Further, the outer body 30 is defined by a cylindrical shape and extends along an axis Y that is generally perpendicular to longitudinal axis L. Further, the outer body 30 defines a lumen 28 extending therethrough.

Figure 2:
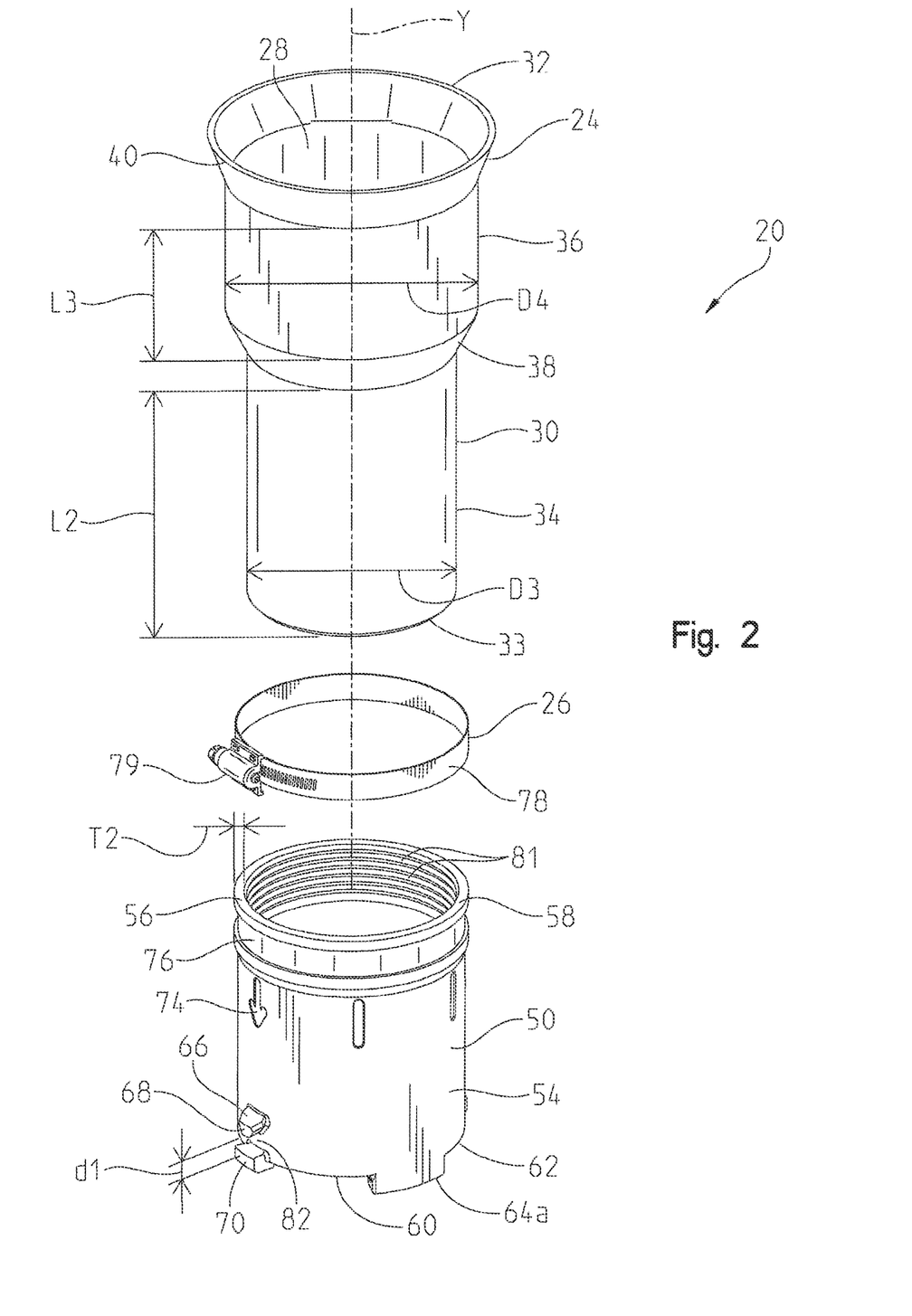
FIG. 2 is an exploded view of the lateral connector assembly of FIG. 1A.

In the illustrative embodiment of FIGS. 1A-2, the outer body 30 includes a first portion 34 and a second portion 36. The first portion 34 has a diameter D3 and a length L2. The second portion 36 has a diameter D4 and a length L3. As illustrated, the diameter D2 of the first portion 34 has a value that is less than a value of the diameter D3 of the second portion 36. In some embodiments, the difference in value between diameter D3 and diameter D4 may be as little as 0, 1, or 5 or as great as 15, 12, or 10, or any range including any two of these amounts as endpoints. However, various other differentials between the diameters D3, D4 may be incorporated. In some embodiments, the difference between the value of the length L2 and the length L3 may be as little as 0, 0.5, or 1 or as great as 2.5, 3, or 3.6, or any range including any two of these amounts as endpoints.

As illustrated, the first portion 34 is coupled to the second portion 36 through a tapered portion 38 to bridge the differing diameters D3, D4. Further, the hub 24 has a flared portion 40 extending from the second portion 36 of the hub 24 which may be used for receiving the connecting or branch pipe, as will be described further herein.

With reference primarily to FIG. 2, the sleeve 22 includes an outer body 50 having a generally cylindrical shape. The generally cylindrical shape extends between a first end 56 having a circumferential edge 58 and a second end 60 having a circumferential edge 62. The outer body 50 has an inner surface 52 and an outer surface 54 and a nominal thickness T2 of the outer body 50 defined therebetween. The sleeve 22 includes at least one hub stop feature 64 extending generally downward from the second end 60, and more particularly, extending from the circumferential edge 62 of the second end 60. The at least one hub stop feature 64 may be configured for receiving a portion of the hub 24 to prevent over extension of the hub 24 through the sleeve 22. For example, the at least one hub stop feature 64 may have a generally planar and rectangular surface that defines a groove or an indentation that may receive the hub 22. However, in other embodiments, the at least one hub stop feature 64 may incorporate other profiles or shapes such as a generally concave or convex surface or a generally circular shape.

Additionally, in the illustrative embodiment of FIGS. 2-3, the circumferential edge 62 has a first hub stop feature 64a and a second hub stop feature 64b, each hub stop feature 64 extending along only a finite portion of the circumferential edge 62 with the hub stop features 64 position diametrically opposite one another. However, in other embodiments, the circumferential edge 62 may have three or more hub stop features. Additionally, an arcuate length or extent of each hub stop feature 64 may be varied. For example, in embodiments, the entirety of the circumferential edge 62 may have the hub stop features 64 extending therefrom. In some embodiments, the majority of the circumferential edge 62 may have the hub stop features 64 extending therefrom.

Further, the outer body 50 includes at least one pipe stop feature 66 defined by an outer radial stop 68 and an inner radial stop 70 extending outward from the outer surface 54 of the outer body 50. In these embodiments, and as described previously herein, the term "outer radial" may characterize a component as arranged at a position that is further from the longitudinal axis L than the position of a component characterized as "inner radial." In other words, the outer radial stop 68 may be arranged further from the longitudinal axis L than the inner radial stop 70.

As illustrated, the outer radial stop 68 and the inner radial stop 70 are separated by an opening 82 that is defined by a longitudinal distance d1 extending between the outer radial stop 68 and the inner radial stop 70. The opening 82 may be designed such that the sleeve 22 may receive a portion of the wall 12 of the pipe 10 between the outer radial stop 68 and the inner radial stop 70. In this way, the outer radial stop 68 acts as an upper axial limit for the sleeve 22 to inhibit the sleeve 22 from shifting upwards out of the opening 8 of the pipe 10. Further, the inner radial stop 70 acts as a lower axial limit for the sleeve 22 to inhibit movement of the sleeve 22 further downward into the opening of the pipe 10 than is desired. However, as illustrated in best in FIG. 3, the inner pipe wall 13 and the distance d1 are configured such that after reception of the inner pipe wall 13 between the outer radial stop 68 and the lower radial stop 70, a longitudinal gap and/or spacing may remain between the inner pipe wall 13 and at least one of the outer radial stop 68 and the inner radial stop 70. In this way, some axial shifting of the hub and sleeve assembly 20 may be permitted. Additionally, this configuration allows for the accommodation of corrugated pipes having inner walls with varying thicknesses. These configurations will be described further with respect to FIGS. 9A-9C. Further, in various embodiments, the at least one pipe stop feature 66 may include two or more pipe stop features 66 arranged around the circumference of the outer body 50. For example, the at least one pipe stop feature 66 may include two pipe stop features that are diametrically opposed (i.e., spaced from one another by approximately 180 degrees). In this way and as described further below, the diametrically opposed configuration may allow for the at least one pipe stop feature 66 to be located at a position that is between the peaks 17 of the corrugations of the pipe 10.

With reference still to FIG. 2, the outer body 50 of the sleeve 22 additionally includes a plurality of alignment features 74. Illustratively, the alignment features 74 may be visible arrows molded or etched into the surface of the outer body 50. The alignment features 74 may indicate to the user the circumferential positioning of the at least one pipe stop feature 66 for ease of insertion of the assembly 20 into the opening 8 of the corrugated pipe 10. For example, the alignment features 74 indicate to the user which portion of the sleeve 22 is to be coupled with and receive the pipe wall 12. More specifically, the alignment features 74 are positioned longitudinally aligned and vertically above the at least one pipe stop feature 66 for providing this positioning indication. As illustrated best in FIG. 6, in some embodiments, the at least one pipe stop feature 66 is positioned between two peaks of the plurality of peaks 17 of the pipe 10 such that the at least one pipe stop feature 66 engages the pipe 10 within one of the plurality of valleys 19 of the pipe 10.

Further, as illustrated in FIG. 2, the outer body 50 includes an indentation 76 extending circumferentially around the outer body 50 at a position towards the first end 56 of the outer body 50. The indentation 76 may be configured for reception of the clamp 26. For example, the clamp 26 includes a ring portion 78 that may be received into the indentation 76 of the sleeve 22. The clamp 26 additionally includes a fastening mechanism 79 for releasing and/or securing the ring portion 78 around the sleeve 22. In some embodiments, the fastening mechanisms 79 is a protrusion that may be used as a ratcheting mechanism receiving portions of the ring portion 78 as the clamp 26 is tightened and/or loosened. With reference still to FIG. 3, the first end 56 of the sleeve 22 may additionally include a plurality of ribbed features 81 on an inner surface of the sleeve 22 which may engage with the hub 24 during assembly of the hub and sleeve assembly 20 in order to increase engagement and sealing between the hub 24 and the sleeve 22.

Figure 4A:
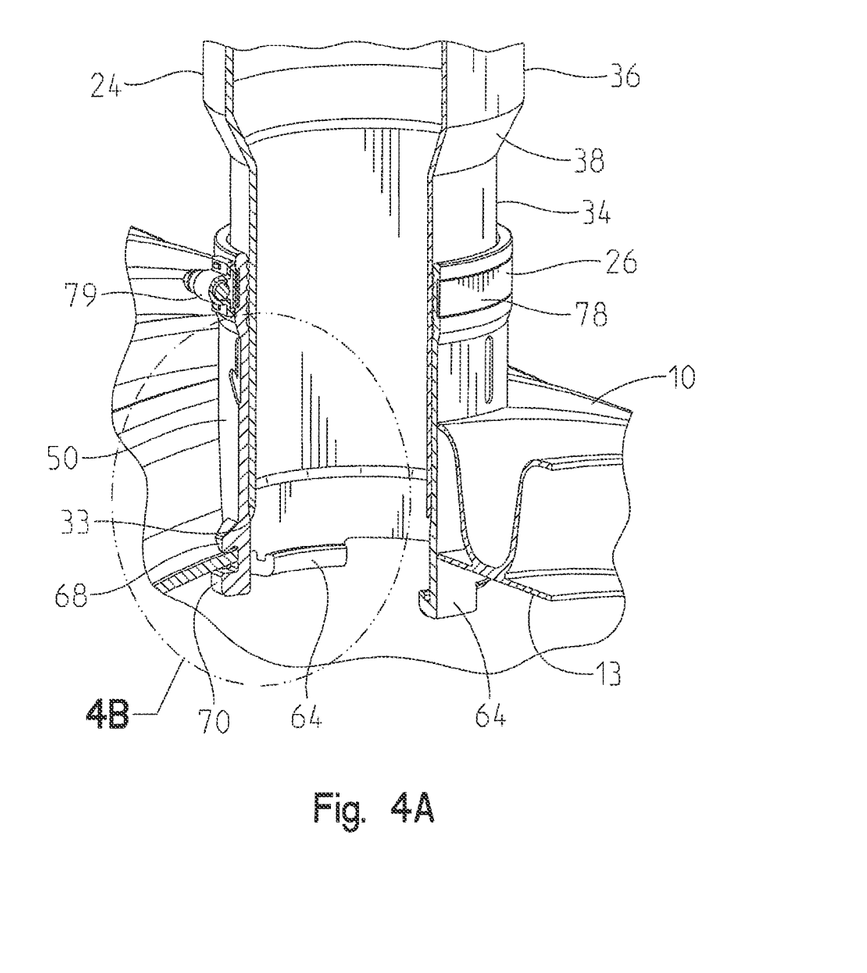
FIG. 4A is a cross sectional view of a further step during assembly of the lateral connector assembly.
Figure 5:
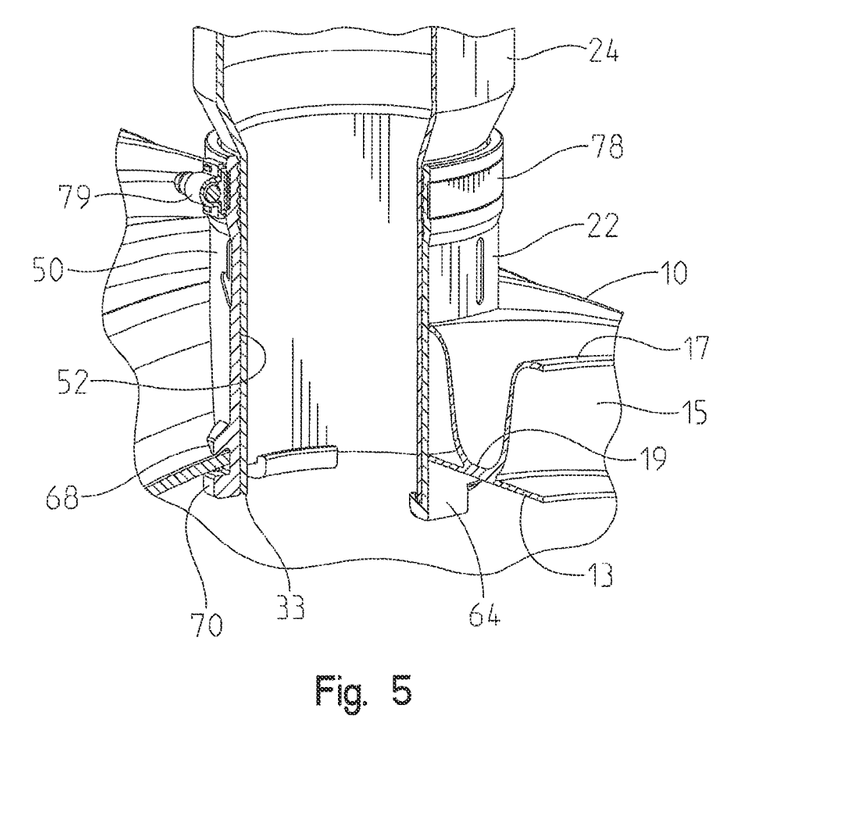
FIG. 5 is a cross sectional view of a further step during assembly of the lateral connector assembly.

With reference now to FIGS. 3-5, the arrangement of the hub and sleeve assembly 20 into the corrugated pipe 10 will be described. In the illustrative embodiment of FIG. 3, the sleeve 22 is inserted at least partially into the pipe wall 12 of the corrugated pipe 10. More particularly, the at least one pipe stop feature 66 receives at least a portion of the inner pipe wall 13 of the pipe wall 12. As such, the inner pipe wall 13 of the corrugated pipe 10 is arranged between the outer radial stop 68 and the inner radial stop 70. This ensures that the sleeve 22 is fixed within the opening of the corrugated pipe 10 and will not translate axially (i.e., along axis Y). Once the sleeve 22 is inserted and secured within the opening of the corrugated pipe 10, the hub 24 may then be inserted into a lumen defined by the body 50 of the sleeve 22. For example, in the illustrative embodiment of FIG. 3, the hub 24 is partially inserted into the sleeve 22 such that at least the distal end 33 (FIG. 2) of the hub 24 is received within the first end 56 (FIG. 2) of the sleeve 22. The hub 24 may then be continuously pushed inward and inserted further into the sleeve 22. As illustrated in at least FIG. 4A, the hub 24 and the sleeve 22 are sized such that an outer surface of the hub 24 is in contact with an inner surface of the sleeve 22 during the insertion of the hub 24 into the sleeve 22, ensuring a tight and high contact coupling between the sleeve 22 and the hub 24. As illustrated in FIG. 4A, the hub 24 may be inserted into the sleeve 22 with an insertion fit until reaching a region of increasing wall thickness of the sleeve 22. As will be described further, the region of increasing wall thickness of the sleeve 22 will allow for a compressive seal to be formed once the hub 24 has been fully inserted. However, at the configuration illustrated in FIG. 4A, an external force may be required to force the hub 24 further into the sleeve 22.

Figure 4B:
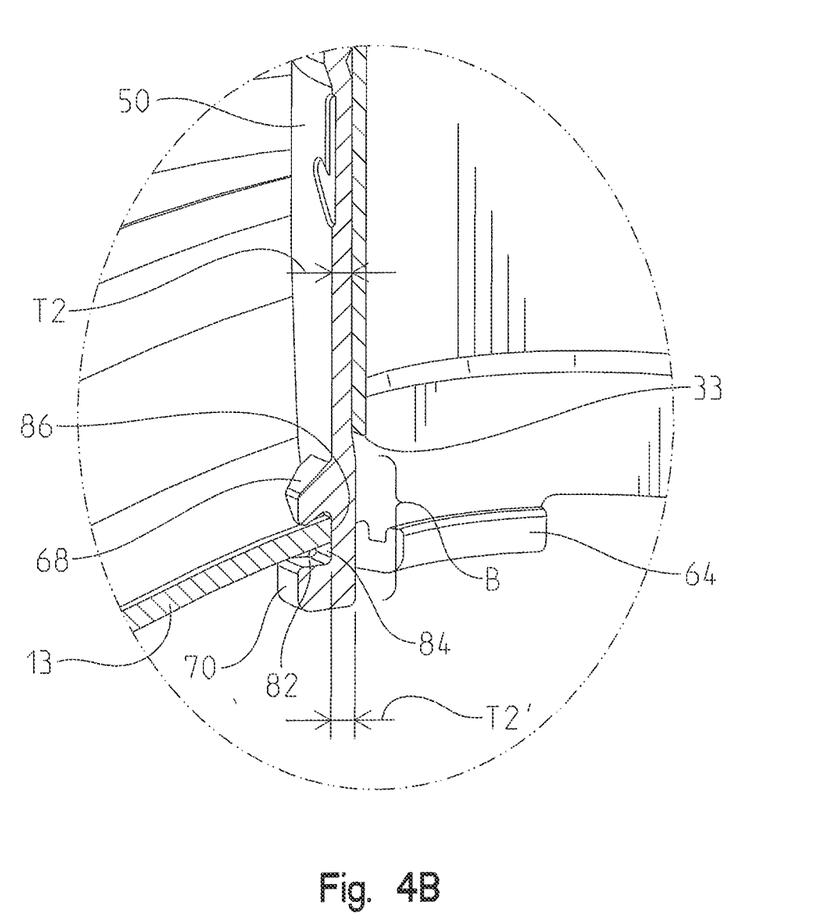
FIG. 4B is an enlarged view of a portion of the cross-sectional view of FIG. 4A.

The region of increased thickness of the sleeve 22 will be described further herein with reference to FIG. 4B. More particularly, FIG. 4B illustrates an enlarged view of a portion of the hub and sleeve assembly 20 shown in FIG. 4A. As illustrated, the outer body 50 of the sleeve 22 is defined by a nominal thickness T2 that extends from the first end 54 of the outer body 50 towards the second end 58 of the outer body 50. At the second end 58 of the outer body 50 of the sleeve 22, the wall thickness increases from the nominal thickness T2 to a thickness T2' having a value that is greater than the nominal thickness T2. In this way, towards the second end 58 of the sleeve 22, the outer body 50 has a region B of increased thickness defined by the portion of the outer body 50 having a wall thickness that is greater than the nominal thickness T2. Within this region B, and on the outer surface 54 of the outer body 50, the outer body 50 includes the outer and inner radial stops 68, 70 extending therefrom. As previously described, the outer and inner radial stops 68, 70 define the opening 82 extending therebetween that receives the inner pipe wall 13 of the pipe wall 12. More particularly, a radial inner surface 84 of the opening 82 engages with a radial outward surface 86 of the inner pipe wall 13. In this way, the radial inner surface 84 of the opening 82 of the sleeve 22 is in direct compressive abutment with the radial outward surface 86 of the inner pipe wall 13 around an entire circumference of the hub and sleeve assembly 20 once the hub and sleeve assembly 20 is inserted within the opening 8.

The hub 24 may then be continuously inserted into the sleeve 22 until the second end of the hub 24 is in engagement with the one or more hub stop features 64 of the sleeve 22. For example, FIG. 5 illustrates a final position of the hub 24 within the sleeve 22. In this configuration, the distal end 33 of the hub 24 is receiving within the at least one hub stop feature 64 of the sleeve 22 and permitted from any further vertical shifting of the hub 24 downwards and vertically below the hub stop feature 64 of the sleeve 22. Additionally, in the illustrative embodiment of FIG. 5, the clamp 26 is arranged around a distal portion of the sleeve 22 and engages the sleeve 22 against the first portion 34 of the hub 24, directly adjacent the tapered portion 38. In this way, the user or operator installing the hub and sleeve assembly 20 may have the ability to loosen and/or tighten the clamp 26 onto the sleeve 22 and the hub 24. Further, while only one clamp 26 is illustrated in use with the hub and sleeve assembly 20, any number of clamps 26 may be incorporated. Further, various different types of clamps 26 may be incorporated and the clamp 26 illustrated herein is merely provided as an example.

Figure 6:
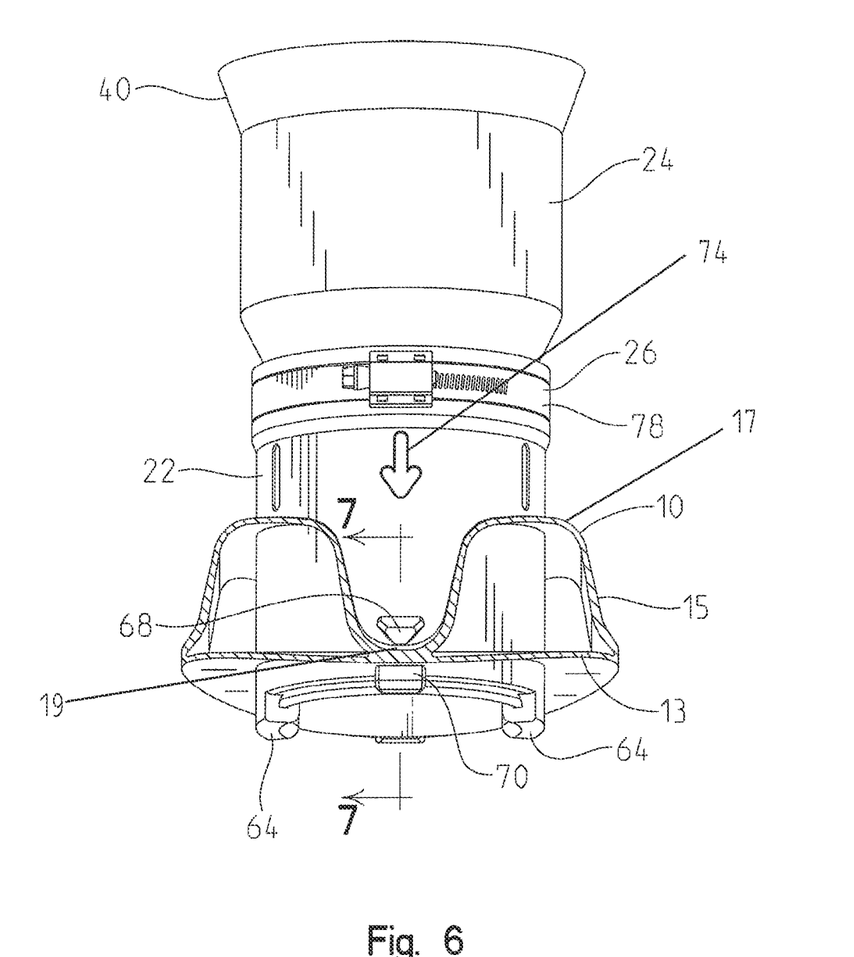
FIG. 6 is a side view of the lateral connector assembly positioned within the corrugated pipe of FIG. 1.

In the configuration illustrated in FIGS. 5 and 6, the hub 24 has been fully inserted and sealingly engaged within the sleeve 22 to form the hub and sleeve assembly 20. More particularly, due to the insertion of the hub 24, a compressive seal is formed between the hub and sleeve assembly and the corrugated pipe 10. The compressive seal will be described further herein with reference to FIGS. 7-8.

Figure 7:
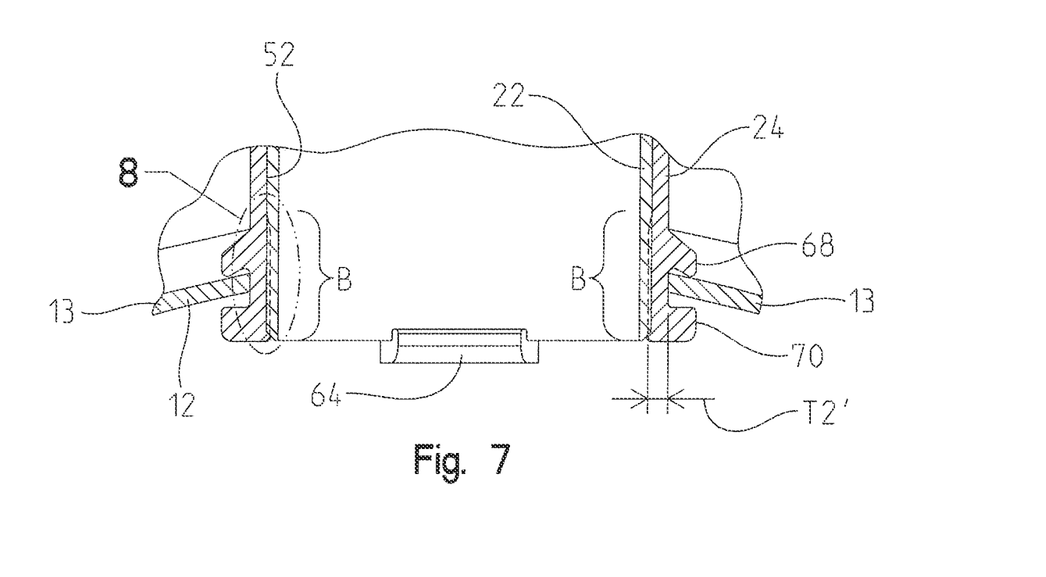
FIG. 7 is a cross sectional view of a portion of the lateral connector assembly positioned within the corrugated pipe of FIG. 6.

FIG. 7 illustrates a cross sectional view of a portion of the hub and sleeve assembly 20 arranged within the opening 8 of the corrugated pipe 10. As illustrated, the outer surface of the hub 24 is in contact with the inner surface 52 of the outer body 50 of the sleeve 22. However, as previously described, the nominal thickness T2 of the outer body 50 of the sleeve 22 increases along the region B of increased thickness. In result, full insertion of the hub 24 into the sleeve 22 causes the distal end 33 of the hub 24 to be pressed against the region of increased thickness of the outer body 50 of the sleeve 22. However, the hub 24 is formed of a material that fails to deform, compress, or otherwise change in shape. As a result, the compression of the hub 24 against the second end 56 of the sleeve 22 causes a force to be exerted by the sleeve 22 in the region of increased thickness against the portion of the corrugated pipe 10 that is in contact with the sleeve 22, for example, the portion of the pipe 10 that is received between outer and inner radial stops 68, 70, illustratively, the inner pipe wall 13 due to the inner pipe wall 13 being engaged with the hub and sleeve assembly 20 at a position that is laterally aligned with the region of increased thickness.

Figure 8:
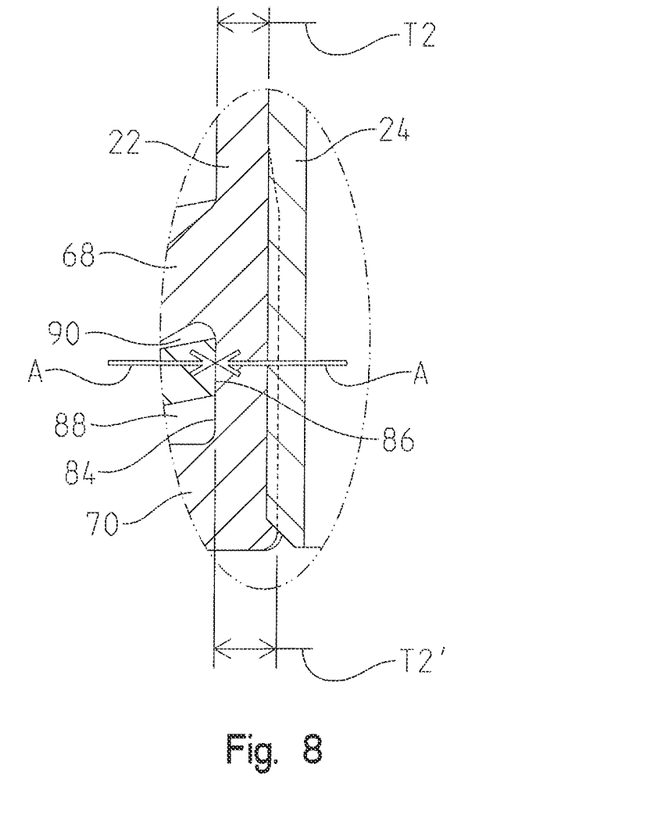
FIG. 8 is an enlarged view of a portion of the lateral connector assembly as shown in FIG. 7.

More particularly, the arrows A shown in FIG. 8 illustrate the directionality of the compressive force that is exerted by the sleeve 22 onto the corrugated pipe 10 and the reciprocating compressive force exerted by the corrugated pipe 10, and more specifically the inner pipe wall 13, onto the sleeve 22. The compressive seal is thus formed between the sleeve 22 and the pipe 10 which increases the sealing engagement between the sleeve and the hub assembly 20 with the pipe 10. Therefore, an annular seal is created around an entire circumference of the hub and sleeve assembly 20 between the hub and sleeve assembly 20 and the inner pipe wall 13 of the pipe 10. This seal may decrease the capability of fluid leaks between the engagement interface of the sleeve and the hub assembly 20 and the pipe 10. Further, in some embodiments, the compressive seal formed between the inner pipe wall 13 and the hub and sleeve assembly 20 may be the only seal that is formed between the corrugated pipe 10 and the hub and sleeve assembly 20. In other words, the outer radial stop 68 and the inner radial stop 70 may not provide a sealing function but may instead just provide axial restraints on the positioning of the hub and sleeve assembly 20 within the corrugated pipe 10.

Additionally, in some embodiments, after complete insertion of the hub 24 into the hub and sleeve assembly 20, an additional pipe (not shown) may be inserted into the hub 24. For example, an additional pipe may be inserted at least partially through the proximal end 32 of the hub 24. In these embodiments, the hub and sleeve assembly 20 may include an additional clamp 26 that is positioned around the hub 24 and at a positioned directly below the tapered portion 38 to secure the positioning of the hub 24 within the sleeve 22. In further embodiments, additional clamps 26 may be incorporated and arranged at various positions along the hub 24 and/or the sleeve 22 to secure the positioning of the additional pipe within the hub 24. As such, in these embodiments, the hub and sleeve assembly 20 facilitates a sealed coupling between the corrugated pipe 10 and the additional pipe.

As previously described, the arrangement of the pipe stop features 66 and the distance d1 extending longitudinally between the inner radial stop 70 and the outer radial stop 68, allows for the insertion of the hub and sleeve assembly 70 into corrugated pipes having varying thicknesses, and more particularly, different thicknesses of the inner pipe wall 13.

Figure 9A:
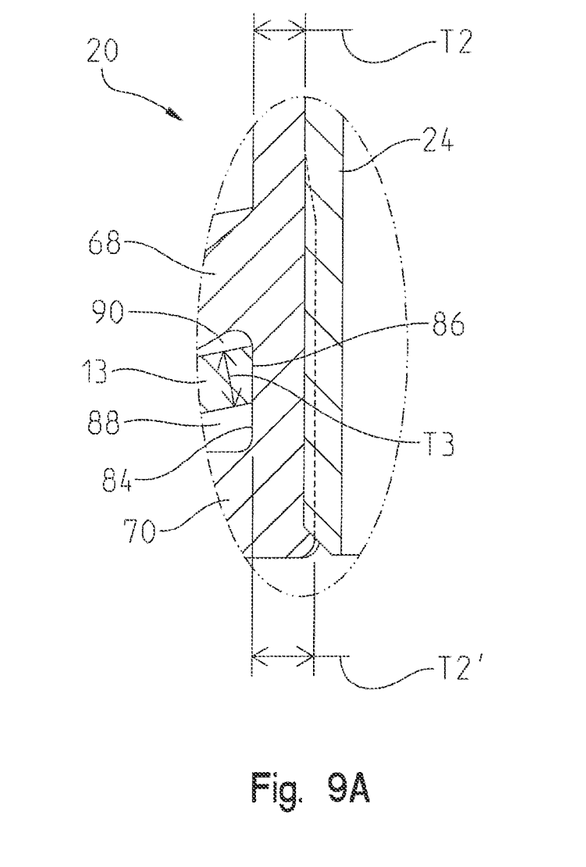
FIG. 9A is an enlarged view of the portion of the lateral connector assembly of FIG. 8 inserted into a corrugated pipe.

For example, as illustrated in FIG. 9A, the inner pipe wall 13 is defined by thickness T3. In this way, when the inner pipe wall 13 is received within the opening 82 defined by the pipe stop feature 66, there remains a longitudinal gap 88 between the inner pipe wall 13 and the inner radial stop 70 and a longitudinal gap 90 extending between the inner pipe wall 13 and the outer radial stop 68. However, in some embodiments, the inner pipe wall 13 may have a larger thickness such that one or both of the longitudinal gaps 88, 90 are smaller than as illustrated in FIG. 9A.

Figure 9B:
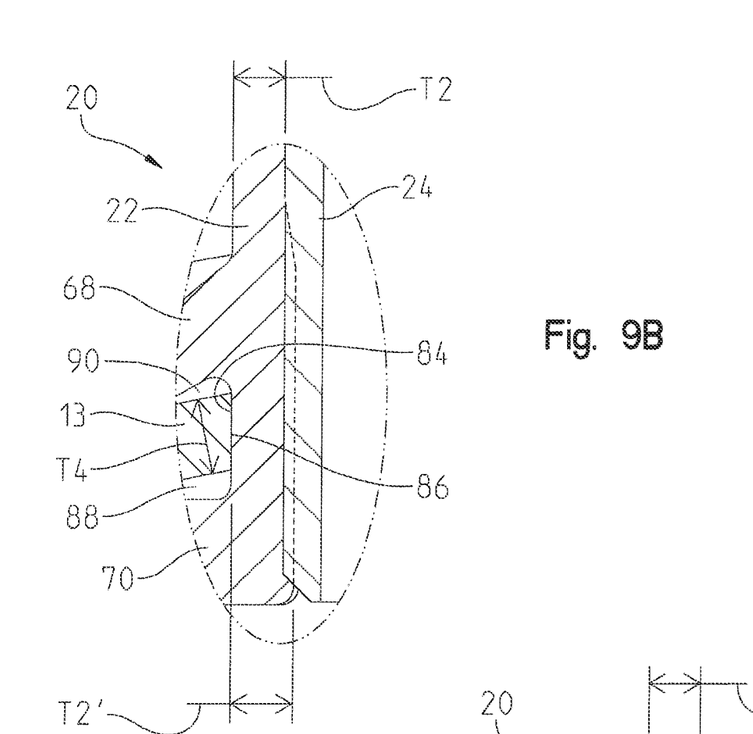
FIG. 9B is an enlarged view of the portion of the lateral connector assembly of FIG. 8 inserted into a corrugated pipe.

For example, as illustrated in FIG. 9B, the hub and sleeve assembly 20 has been inserted into the corrugated pipe 10 having the inner pipe wall 13 with a modified thickness, illustratively a thickness T4. The value of the thickness T4 is configured such that when the inner pipe wall 13 is received within the opening 82 defined by the pipe stop feature 66, the inner pipe wall 13 does not contact the inner radial stop 70 and the outer radial stop 68. In this way a longitudinal gap remains between the inner pipe wall 13 and the outer radial stop 68 and the inner pipe wall 13 and the inner radial stop 70. However, since the thickness T4 is greater than the thickness T3, the longitudinal gap 88 remaining between the inner pipe wall 13 and the outer radial stop 68 is smaller than the longitudinal gap 88 illustrated between the inner pipe wall 13 and the outer radial stop 68 as shown in FIG. 9A. However, in further embodiments, the inner pipe wall 13 may have a thickness value such that the inner pipe wall 13 is in direct contact with one of and/or both of the outer radial stop 68 and the inner radial stop 70.

Figure 9C:
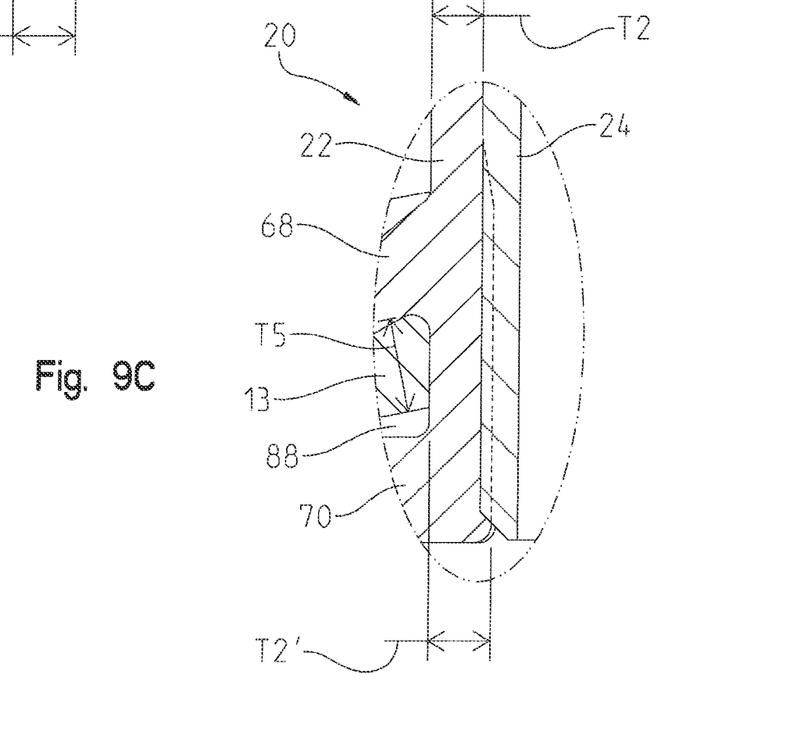
FIG. 9C is an enlarged view of the portion of the lateral connector assembly of FIG. 8 inserted into a corrugated pipe.

For example, as illustrated in FIG. 9C, the hub and sleeve assembly 20 has been inserted into the corrugated pipe 10 having the inner pipe wall 13 with a modified thickness, illustratively a thickness T5. The thickness T5 has a value such that when the inner pipe wall 13 is received within the opening defined by the pipe stop feature 64, the inner pipe wall 13 is in contact with the outer radial stop 68 such that there is not a longitudinal gap 88 extending between the inner pipe wall 13 and the outer radial stop 68, but the longitudinal gap 90 extending between the inner pipe wall 13 and the inner radial stop 70 remains. While illustrated as being in complete direct contact with the surface of the outer radial stop 68, in some embodiments, a smaller portion of the inner pipe wall 13 may be in contact with only a portion of the surface of the outer radial stop 68. In other words, in some embodiments, a contact area between the inner pipe wall 13 and the outer radial stop 68 is less than a total surface area of the outer radial stop 68. However, in some embodiments, an alternative inner pipe wall may be configured such that the inner pipe wall is in contact with both the outer radial stop 68 and the inner radial stop 70. Or, in further embodiments, an inner pipe wall 13 may be configured such that it is sin direct contact with the inner radial stop and not the outer radial stop.

The above-described configurations of FIGS. 8A-8C illustrate the ability of the hub and sleeve assembly 20 to accommodate corrugated pipes having various thicknesses, and more particularly, the inner pipe wall of the corrugated pipes having various thicknesses. This provides the advantage of being able to use the hub and sleeve assembly 20 with different types of corrugated pipes 10 without having to alter or modify the hub and sleeve assembly 20.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A corrugated pipe junction, comprising:
a corrugated pipe including a pipe wall having an inner pipe wall and an outer pipe wall, the outer pipe wall having a plurality of peaks and a plurality of valleys disposed between the plurality of peaks, and an opening extending through the pipe wall;
a hub and sleeve assembly received within the opening of the pipe wall, the hub and sleeve assembly including a hub received within the sleeve such that at least a portion of the outer surface of the hub is in contact with an inner surface of the sleeve;
a second pipe, received within a flared portion of the hub; and wherein:
the sleeve comprises a proximal end opposite a distal end, the sleeve further includes a hub stop feature extending from the distal end and configured for receiving a portion of the hub,
the sleeve further comprises at least one pipe stop feature defined by an outer radial stop and an inner radial stop configured for receiving at least a portion of the inner pipe wall between the outer radial stop and the inner radial stop where the inner pipe wall is received with an opening defined between the outer radial stop and the inner radial stop, and a gap extends longitudinally between at least one of the outer radial stop and the inner radial stop and the inner pipe wall of the corrugated pipe, and
when the hub and sleeve assembly is received within the opening of the pipe wall, a compressive seal is formed between the hub and sleeve assembly and the inner pipe wall such that the hub and sleeve assembly is sealingly engaged with the inner pipe wall around an entire circumference of the hub and sleeve assembly, the compressive seal is defined at an interface between a radial inner surface of the opening between the inner radial stop and the outer radial stop and a radial outward surface of the inner pipe wall to form an annular seal around an entire circumference of the hub and sleeve assembly, the sleeve has a body defined by a first thickness at a proximal portion of the sleeve and defined by a second thickness at a distal portion of the sleeve, and the distal portion of the sleeve comprises a region of increased thickness and includes at least a transition region from the first thickness to the second thickness.

2. The corrugated pipe junction of claim 1, wherein the hub stop feature for receiving the portion of the hub has a generally planar profile.

3. A method of forming a junction between a hub and sleeve assembly and a corrugated pipe, the corrugated pipe having a pipe wall including an inner pipe wall and an outer pipe wall, the outer pipe wall including a plurality of peaks and a plurality of valleys disposed between the plurality of peaks, the method comprising:
inserting a sleeve of the hub and sleeve assembly through an opening of the pipe wall of the corrugated pipe to engage the inner pipe wall of the corrugated pipe with a portion of at least one pipe stop feature extending from the sleeve, the sleeve defined by a first end and a second end and an outer body extending therebetween; the outer body having a nominal thickness at a proximal portion and a second thickness at a distal portion, the distal portion comprising a region of increased thickness and including at least a transition region from the nominal thickness to the increased thickness, and wherein the at least one pipe stop feature of the sleeve is defined by an inner radial stop and an outer radial stop extending from an outer surface of the sleeve and an opening arranged between the inner radial stop and the outer radial stop, and wherein the step of engaging at least one stop pipe feature of the sleeve with the corrugated pipe includes receiving a portion of the inner pipe wall between the inner radial stop and the outer radial stop such that a radial inner surface of the opening of the at least one pipe stop feature is in direct abutment with the outer radial surface of the inner pipe wall and a gap extends longitudinally between at least one of the outer radial stop and the inner radial stop and the inner pipe wall of the corrugated pipe inserting a hub of the hub and sleeve assembly within the sleeve until a bottom edge of the hub engages with at least one hub stop feature extending from a bottom surface of the sleeve such that a portion of the hub is compressed against the region of increased thickness and laterally aligned with the portion of the sleeve that is engaged with the inner pipe wall, such that a compressive seal is formed between the corrugated pipe and the hub and sleeve assembly around an entire circumference of the hub and sleeve assembly, wherein the compressive seal is formed between the radial inner surface of the opening of the at least one pipe stop feature and the outer radial surface of the inner pipe wall; and inserting a second pipe into a flared portion of the hub.

4. The method of claim 3, wherein the at least one hub stop feature includes a planar, rectangular surface extending from the second end of the sleeve.

5. The method of claim 3, further including tightening a clamp arranged around an outer body of the sleeve to secure the engagement between the sleeve and the hub.

* * * * *